United States Patent [19]

Hudson

[11] Patent Number: 5,372,374
[45] Date of Patent: Dec. 13, 1994

[54] LEVER DEVICE FOR EQUALIZING BICYCLE WORKOUT

[76] Inventor: Larry R. Hudson, 10450 W. Fair Ave. #D, Littleton, Colo. 80127

[21] Appl. No.: 98,795
[22] Filed: Jul. 29, 1993
[51] Int. Cl.⁵ .............................................. B62M 1/12
[52] U.S. Cl. ...................................... 280/233; 280/253
[58] Field of Search ............ 280/233, 234, 253, 256, 280/257, 259, 261

[56] References Cited

U.S. PATENT DOCUMENTS

| 593,975 | 11/1897 | Ernst | 280/233 |
| 598,026 | 1/1898 | Slippern | 280/234 |
| 3,921,464 | 11/1975 | Greseth | 280/234 |
| 4,541,647 | 9/1985 | Braun | 280/234 |

FOREIGN PATENT DOCUMENTS

| 595605 | 10/1925 | France | 280/233 |
| 601019 | 2/1926 | France | 280/234 |
| 282046 | 1/1931 | Italy | 280/233 |
| 402181 | 2/1943 | Italy | 280/233 |
| 1299891 | 3/1987 | U.S.S.R. | 280/233 |

*Primary Examiner*—Karin L. Tyson
*Assistant Examiner*—Kevin Hurley

[57] ABSTRACT

The invention is a device for providing an upper body workout while riding a bicycle. The device comprises a base member which is secured to the bicycle. A lever is pivotally attached to the base member and drives a sprocket. The sprocket, in turn, drives a chain which drives a conventional bicycle crank shaft, thus aiding in propulsion of the bicycle. The rider uses one hand on the lever and the other hand grips the handlebars in a conventional manner. The lever has a handle which can be pivoted to either a left or a right side so as to provide a work out for the rider's left or right arm.

3 Claims, 4 Drawing Sheets

LEVER DEVICE FOR EQUALIZING BICYCLE WORKOUT

BACKGROUND-FIELD OF INVENTION

The present invention relates to bicycles or other manpowered vehicles. In particular, this invention assists foot pedals in powering the bike through the use of a leveraged, hand powered device while providing upper body exercise.

BACKGROUND-DESCRIPTION OF PRIOR ART

Bicycles using hands and arms to power them are known but the prior art is cumbersome, unsafe, or require major modifications to said bike. Prior inventions also add too much weight to the bike. Lindsey, Jr. U.S. Pat. No. 4,147,370; Kasayian U.S. Pat. No. 4,437,677; Green U.S. Pat. No. 4,616,840; Fullilove U.S. Pat. No. 4,685,692; Wilhelm, III U.S. Pat. No. 4,733,880; Phillips U.S. Pat. No. 4,773,662; Deutch U.S. Pat. No. 5,039,122; and Moore, Sr. U.S. Pat. No. 5,078,391 are representative of bicycles which utilize both the arms and legs for exercise and/or propulsion purposes.

Lindsey, Jr., Phillips, and Deutch inventions attempt to utilize the front wheel which limits the rider to upgrades on front end of the bike. The prior inventions also require extensive adaptations to original the bike and add much excess weight, bulk and drag when the hand device is not in use if that is an option.

Fullilove's method looks to be very unstable as well as being inadequate providing at best a wrist and forearm workout. Green's method is very bulky and unstable as well as looking very unsafe. Kasayian and Wilhelm III would not work on conventional bikes or would require very extensive modifications as well as being very bulky and unstable. The Moore Sr. method would be a waste of energy because his device does not assist in propulsion, merely uses struts for the upper body workout, as well as being bulky and unstable.

No prior invention allows a rider to leave all original parts untouched, all prior inventions require the replacement of parts i.e. handlebars, forks, handlebar stem. Furthermore, it appears awkward or not possible to ride the bike in the conventional manner of pedaling with feet only if the rider so desires.

SUMMARY OF THE INVENTION

As you can see, there is still a need for a device that will allow an upper body workout while pedaling, that is lightweight and practical without interfering with the conventional design or limiting the rider in any way. My lever device works off the original parts of the bike, and would only require the movement of minor accessories i.e. water bottle, tire pump. It utilizes unused space for mounting and operating. My unit would also assist in pedaling uphill or increasing speed when required. Unlike other devices which require use of both hands and exceptional balance to operate, my invention utilizes one lever which can be used by either arm allowing rider to keep one hand on the handlebars at all times, while also allowing rider the option to use the bike in a conventional manner.

The lever device is centrally located so as not to interfere with steering ability. Because of its central location, the rider can easily have both hands on the handlebars for tricky maneuvers without interference from the lever device. My lever device is light weight and ties directly into the stock crank on the bicycle and is easily mounted. It can be easily adapted to fit any bike or if desired, a custom frame can be made with permanent mounts. The lever comprises a means that will transfer power from the arm to aid in propelling the bike. In one embodiment, the lever is a single unit with a handle which can be moved from left to right and is sleek in design. In another embodiment, a more economic lever which has two parts with a handle located in the center.

Other objects, features and advantages of the present invention will be fully realized upon review of the following detailed description given with reference to the accompanying drawings and appended claims.

DRAWINGS FIGURES

DESCRIPTION-FIGS. 1 to 8

Figure 1:
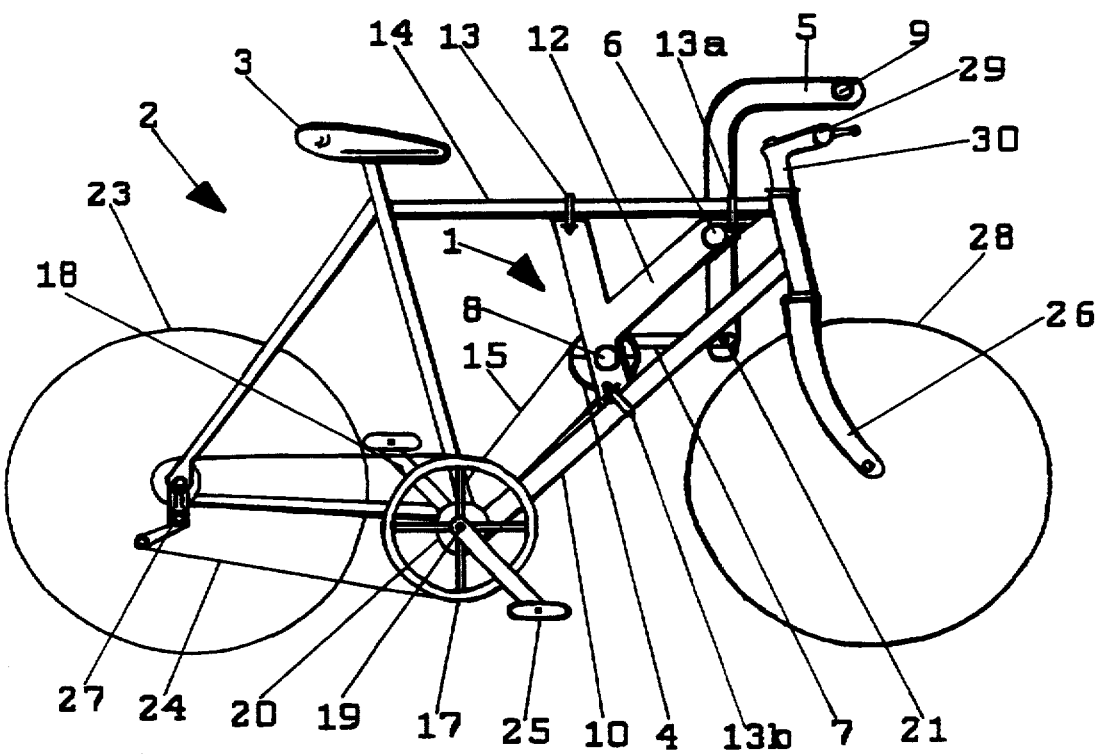
FIG. 1 is a side elevational view illustrating the present invention mounted on conventional bicycle.

Referring to FIG. 1 a conventional bicycle 2 which includes front wheel 28, rear wheel 23, seat 3, handlebars 29, handlebar stem 30, front forks 26, pedals 25, left crank arm 18, drive sprockets 17, axle housing 20, axle 19, drive chain 24 and rear derailleur 27.

Figure 2:
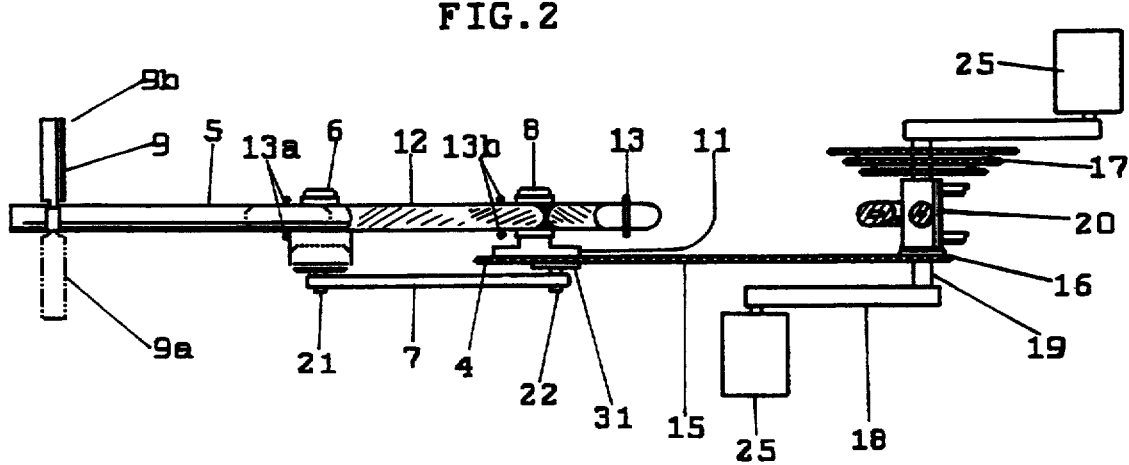
FIG. 2 is a top view of present invention
Figure 3:
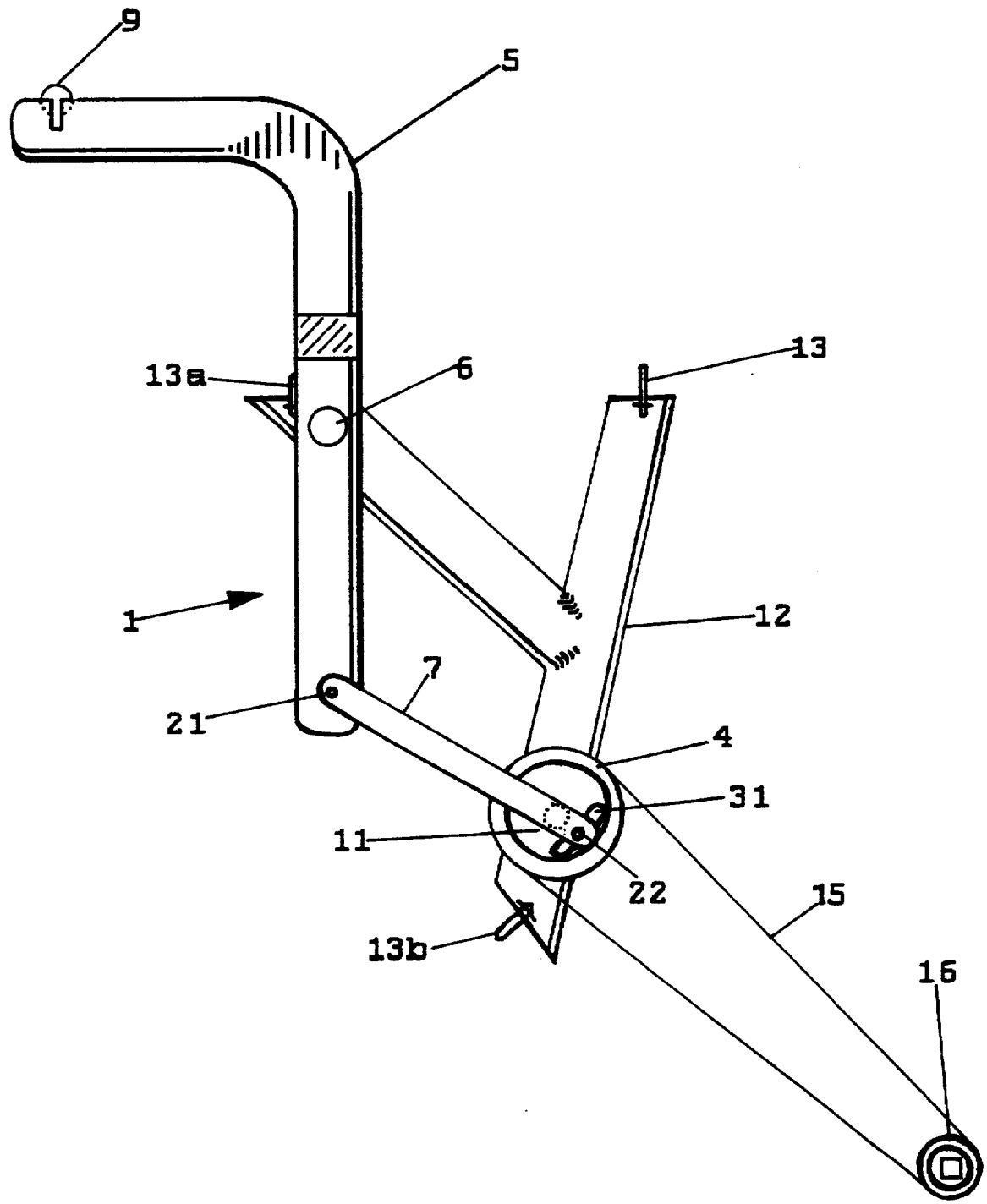
FIG. 3 is a close up view of present invention
Figure 4:
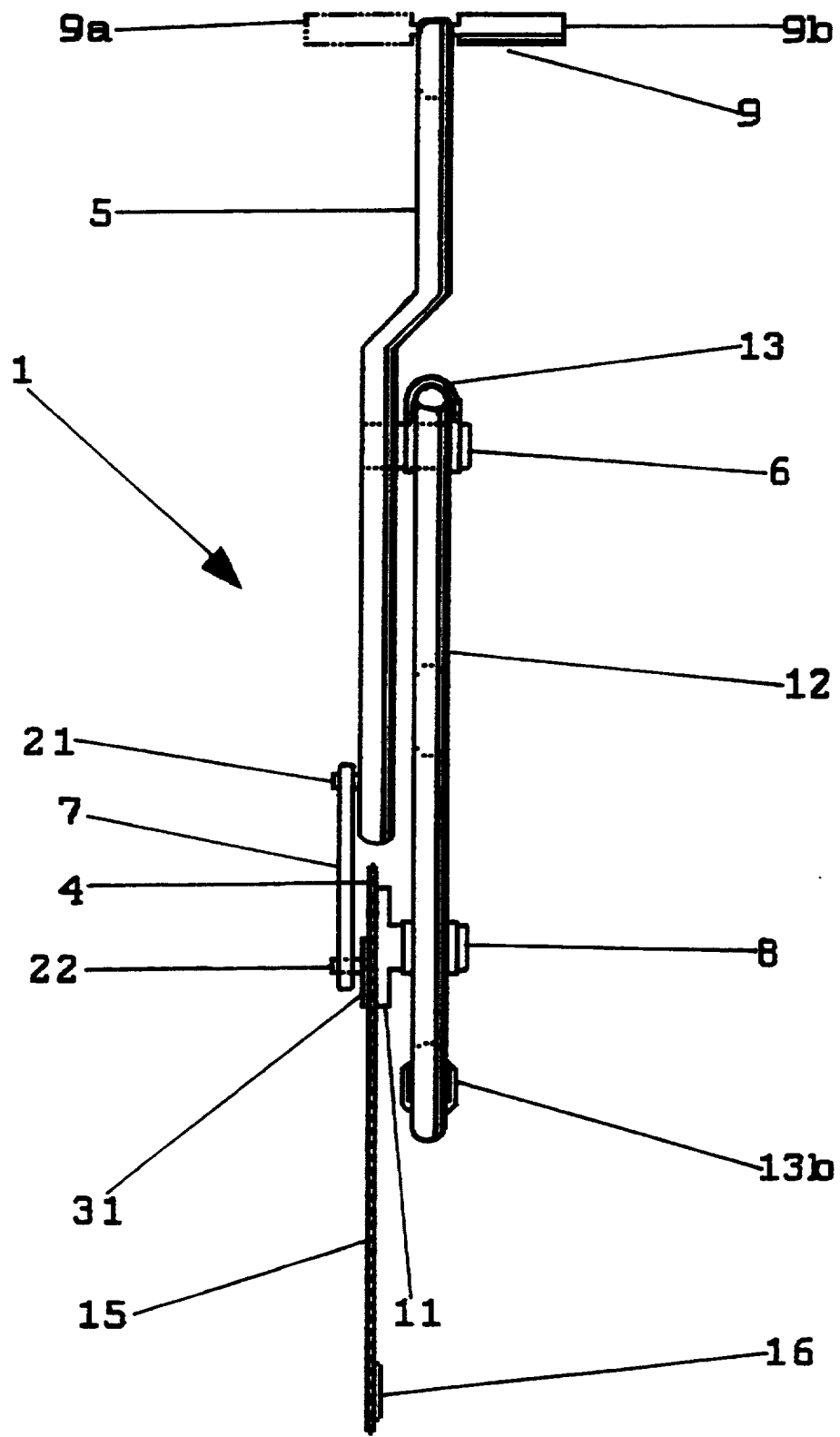
FIG. 4 is a full frontal view of present invention

Referring to FIG. 2, FIG. 3, and FIG. 4 which better illustrate the working elements of the disclosed invention, the lever device 1 comprises a base member 12. According to the illustrated embodiment, the base member 12 is located between the bike's main frame members mounting to bicycle's upper frame tube 14 with suitable securing devices 13 and 13a and to lower frame tube 10 with suitable securing device 13b.

The lever device assembly 1 comprises a lever 5 which is centrally located, with a movable handle 9. Handle 9 moves from the left side 9a of lever 5 to the right side 9b of lever 5 for use with either left or right arm. This is best seen in FIG. 2 and FIG. 4.

The lever 5 is connected at pivotal mount 6 to upper part of base member 12. The respective lever 5 goes upward and angles in such a way to be centrally located over top of frame tube 14 and then extends upward and angles forward parallel to frame tube 14 in such a manner as to clear handlebar stem 30 and handlebars 29.

As lever 5 is moved forward and backward, power is transferred through first rotating joint 21, which connects rod 7 to bottom part of said lever, wherein the other end of said rod is connected with second rotating joint 22 to mount 31. Unit 11 harnesses mount 31 and sprocket 4 which is the first means for conveying rotational energy. A suitable means for coupling the rotational energy such as a chain 15, connects device 4 and a second sprocket for conveying rotational energy 16. Unit 11 is connected to rotable mount 8 and is located on the lower part of base member 12. The second rotational means for conveying energy 16 is mounted on axle 19 between of axle housing 20 and bike's left crank arm 18. Rotational energy is then transferred to bike's stock drive sprockets 17 which conveys rotational energy to drive chain 24 and then to rear wheel 23 thus propelling the bike taking advantage of bike's stock drive system.

Figure 5:
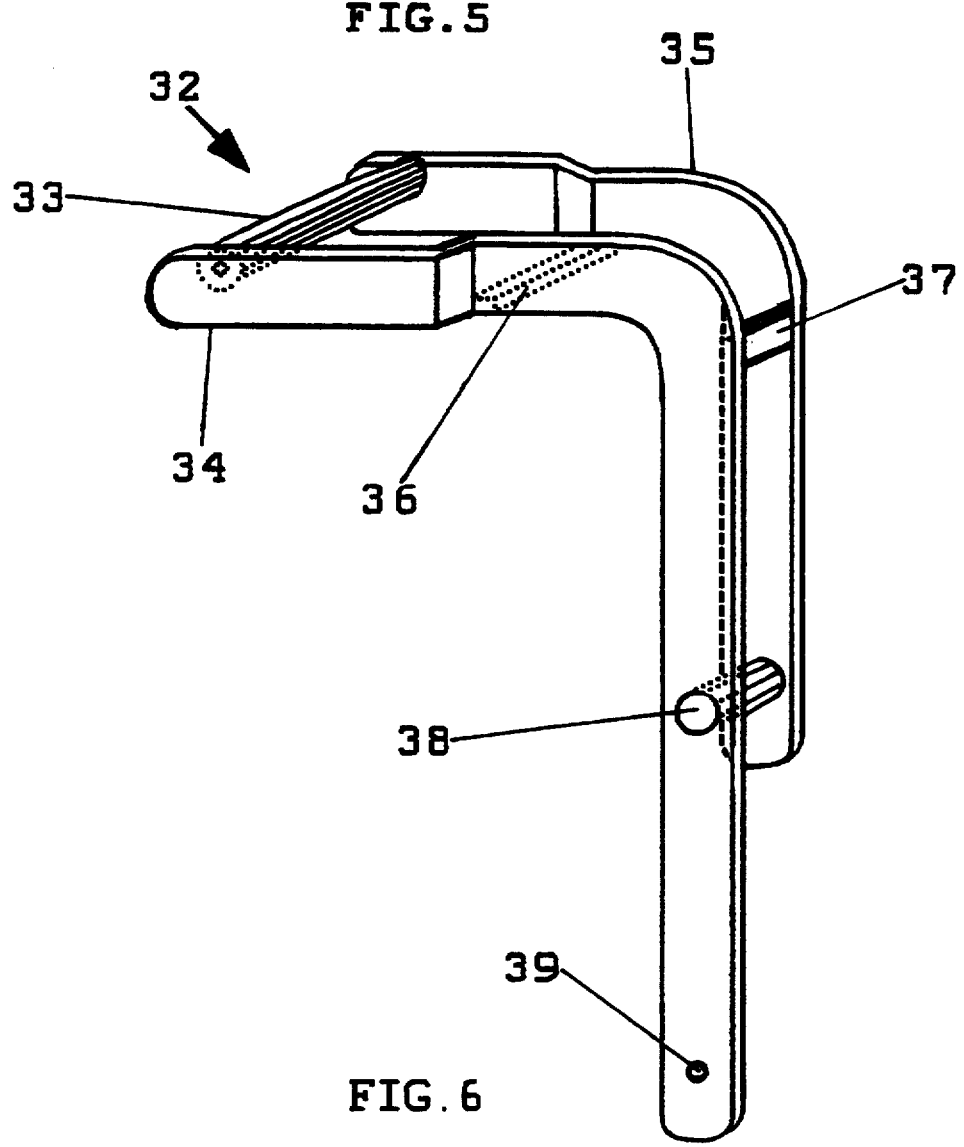
FIG. 5 is an alternative lever for present invention
Figure 6:
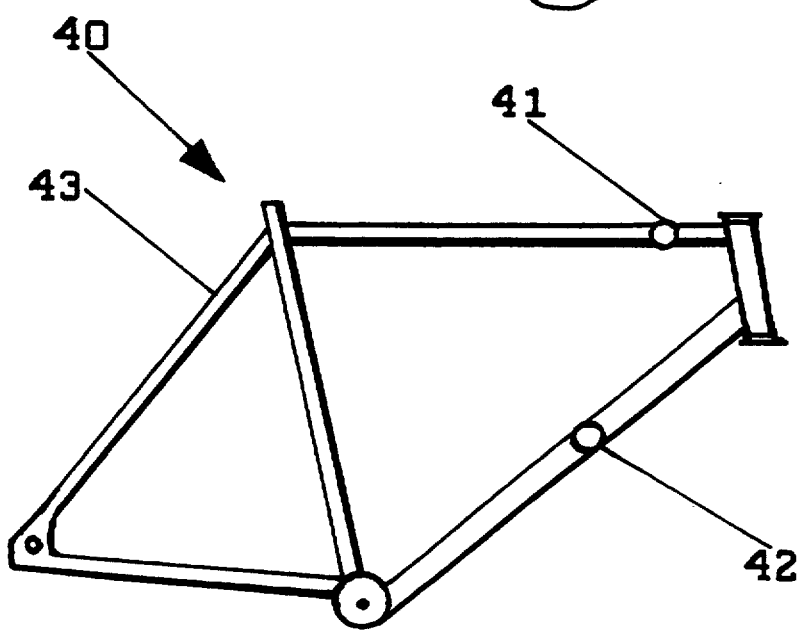
FIG. 6 is a frame having permanent mounts for present invention

Referring to FIG. 5 which shows an optional lever. Optional lever 32 is more economic to manufacture, but not as aesthetically pleasing as before mentioned lever 5. The optional lever 32 consists of sides 34 and 35, a non-moving handle 33, upper brace 36 and lower brace 37, pivotal mount 38 which is the same as pivotal mount 6. Now referring to the final FIG. 6 which shows the custom frame harnessing permanent mounts. Custom frame 40 consists of frame 43, upper mount 41, and lower mount 42, wherein mounts are permanently mounted onto said frame.

In use the operator would mount the bicycle in the conventional manner with one hand on the lever handle 9 and the other hand on the handlebar 29 on the opposite side of the handle. The operator can pivot the handle 9 to either side of the lever 5 so that the operator can work out either left or right arms. The hand which is gripped on the handlebars 29 is used for steering and braking in a conventional manner. The hand gripped on the lever 9 is then pushed and pulled in conjunction with conventional peddling of the bicycle in order to propel the bicycle.

I claim:

1. A combination bicycle and propulsion device comprising: a bicycle including frame, said frame including an upper frame tube and a lower frame tube, a pair of crank arms mounted on an axle, said axle being rotatably mounted in an axle housing, and means for conveying rotational energy from said axle to a rear wheel of the bicycle, a base member mounted between said upper frame tube and said lower frame tube, a lever pivotally mounted to said base member, said lever including a handle, a first device rotationally mounted to said base member, a rod having a first end and second end, said first end being pivotally connected to said lever and said second end being pivotally connected to said first device, a second device rigidly mounted to said axle for rotation therewith, means for rotationally coupling said first and second device together.

2. The combination of claim 1 wherein said handle is pivotally mounted to said lever.

3. The combination of claim 1 wherein the lever is comprised of two side by side members, said members being connected together and being separated from one another by said handle and at least one brace member.

* * * * *